United States Patent
Storch

[11] Patent Number: 5,176,860
[45] Date of Patent: Jan. 5, 1993

[54] METHOD OF THE MANUFACTURE OF AN UPHOLSTERY ELEMENT

[75] Inventor: Helmut Storch, Amberg, Fed. Rep. of Germany

[73] Assignee: Atoma International of America, Inc., Livonia, Mich.

[21] Appl. No.: 746,094

[22] Filed: Aug. 12, 1991

Related U.S. Application Data

[63] Continuation of Ser. No. 377,101, Jul. 10, 1989, abandoned.

[30] Foreign Application Priority Data

Jul. 11, 1988 [DE] Fed. Rep. of Germany ....... 3823584

[51] Int. Cl.$^5$ ............................................. B29C 67/22
[52] U.S. Cl. ................................. 264/46.6; 264/45.1; 264/46.7; 264/255; 264/271.1
[58] Field of Search ............. 264/45.1, 46.6, 46.7, 264/46.8, 255, 271.1, 46.4

[56] References Cited

U.S. PATENT DOCUMENTS

| | | | |
|---|---|---|---|
| 3,505,436 | 4/1970 | Krug et al. | 264/46.8 |
| 3,534,129 | 10/1970 | Bartel | 264/255 |
| 4,046,611 | 9/1977 | Sanson | 264/46.8 |
| 4,118,451 | 10/1978 | Schaus | 264/46.6 |
| 4,268,557 | 5/1981 | Bracesco | 264/46.6 |
| 4,501,541 | 2/1985 | Bethell et al. | 264/46.8 |
| 4,544,126 | 10/1985 | Melchert | 264/46.7 |
| 4,726,086 | 2/1988 | McEvoy | 264/45.1 |
| 4,738,809 | 4/1988 | Storch | 264/46.6 |
| 4,755,120 | 7/1988 | Onnenberg et al. | 264/46.8 |
| 4,755,411 | 7/1988 | Wing et al. | 264/45.1 |
| 4,873,036 | 10/1989 | Urai | 264/46.8 |
| 4,886,630 | 12/1989 | Sugiura et al. | 264/46.8 |
| 4,927,575 | 5/1990 | Brock et al. | 264/45.1 |

FOREIGN PATENT DOCUMENTS

| | | | |
|---|---|---|---|
| 58-173630 | 10/1983 | Japan | 264/46.7 |
| 1229790 | 4/1971 | United Kingdom . | |
| 2114051 | 8/1983 | United Kingdom . | |

*Primary Examiner*—Allan R. Kuhns
*Attorney, Agent, or Firm*—Cushman, Darby & Cushman

[57] ABSTRACT

A method of making an upholstered element wherein a cover is introduced into a mold to which it tightly adheres. The mold is closed by means of a first lid, following which a soft-foam reaction mixture is introduced into a first hollow chamber of the mold closed off by the first lid. At the end of the reaction, the soft-foam reaction mixture fills the first hollow chamber and forms a soft-foam body. Subsequently, the first lid is removed from the mold and replaced by a second lid, the soft-foam body remaining in the mold. Between the soft-foam body in the mold and the second lid, a second hollow space is formed. Subsequently, a rigid-foam reaction mixture is introduced into the second hollow chamber, which at the end of the reaction fills the second hollow chamber and forms a rigid-foam body.

4 Claims, 4 Drawing Sheets

METHOD OF THE MANUFACTURE OF AN UPHOLSTERY ELEMENT

This is a continuation of U.S. patent application Ser. No. 07/377,101, filed on Jul. 10, 1989, which was abandoned upon the filing hereof.

The invention relates to a method for the manufacture of an upholstery element, wherein a cover is introduced into a mold adhering tightly to the sides, whereafter the mold is closed by means of a lid and a reaction mixture is introduced into the closed hollow chamber of the mold, which foams in the course of the reaction taking place and fills the closed hollow chamber, and wherein the cover of the upholstery element is connected with a support element disposed on the upholstery element.

BACKGROUND OF THE INVENTION

To manufacture such upholstery elements it is often required to introduce into the mold, after the cover has been introduced and before the hollow chamber of the mold is closed by means of the lid, an insert which is used for stiffening of the back-foamed upholstery element. This insert may be made of wood, plastic, metal or the like. Introduction of such an insert into the mold requires a certain effort. Customarily an upholstery element manufactured in this manner is made with a support element, which requires that the cover of the back-foamed upholstery element be connected with the support element. Such connection may be accomplished by, for example, crimping, clamping, gluing, stapling, by means of snap-in connections, or the like. The connection between the cover material and the support element requires a further operational step which makes itself felt in the manufacturing costs of such a back-foamed upholstery element.

SUMMARY OF THE INVENTION

It is therefore an object of the invention to supply a method for the manufacture of an upholstery element of the type mentioned above, by means of which a back-foamed upholstery element having a support element can be simply manufactured, and which results in a simple manner in a secure connection between the cover and the support element.

This object is attained by means of the invention in that the mold is initially closed with a first lid after the cover has been introduced, whereafter a soft-foam mixture in introduced into the first hollow chamber of the mold closed off by the first lid, which fills the first hollow chamber at the end of the reaction in the form of a soft-foam body, in that subsequently the first lid is removed from the mold and replaced by a second lid, the soft-foam body remaining in the mold, and a second hollow chamber being formed between the soft-foam body present in the mold and the second lid, and in that subsequently a rigid-foam reaction mixture is introduced into the second hollow chamber which, at the end of the reaction, fills the second hollow chamber with a rigid-foam body which serves as a support element. The soft-foam reaction mixture first introduced into the mold may be a polyurethane cold-curing soft foam. A polyurethane rigid-foam system is preferably used as rigid-foam reaction mixture. The rigid-foam reaction mixture for filling the hollow chamber remaining between the second lid and the soft-foam body may be a so-called polyurethane RIM system, by means of which a dimensionally very stable support element can be manufactured for such an upholstery element. By means of the method according to the invention it is thus possible to manufacture exactly shaped upholstery elements by means of a combination of polyurethane cold-curing soft-foam systems and polyurethane rigid-foam systems. Additionally, there is the potential to fill with foam, for example, the back of such an upholstery element either partially or entirely with so-called PU-RIM systems in such a way, that a dimensionally stable covering, a dimensionally stable frame or a dimensionally stable support element is formed.

In one exemplary embodiment of the method according to the invention the border area of the cover is preferably clamped between the mold and the first lid at the time the mold is closed by means of the first lid, and the border area of the cover is clamped between the mold and the second lid when the mold is subsequently closed by means of the second lid. The border area of the cover is preferably clamped into a stretch frame provided outside of the first or second lid before the mold is closed by means of the first or second lid, and the border area of the cover, extending beyond the second hollow chamber and clamped into the stretch frame and extending beyond the rigid-foam body, is cut off from the upholstery element after the upholstery element has been removed from the mold. In this method the cover therefore not only lies against the exterior of the soft-foam body with its border area, but simultaneously against the entire circumferential surface of the rigid-foam body. Cutting of the border area of the cover extending beyond the rigid-foam body preferably is performed directly at the rigid-foam body, so that there are no portions of the cover extending outwardly from the upholstery element on the finished upholstery element. In this manner unintentional damage of the upholstery element by unintended pulling of the cover off the upholstery element, i.e. the rigid-foam body, is eliminated.

Considerably improved adherence between the border area of the cover and the upholstery element, i.e. in particular the rigid-foam body, is the result of the execution of the method in accordance with the invention, in which the border area of the cover is clamped between the mold and the first lid at the time the mold is closed with the first lid, and in which the border area of the cover is introduced into the second hollow chamber after removal of the first lid and prior to closing of the mold by means of the second lid, after which the second hollow chamber is foamed with the rigid-foam reaction mixture. During the execution of this method the border area of the cover extending beyond the soft-foam body is completely surrounded by the rigid-foam reaction mixture, i.e. covered with foam, so that a rigid connection of the cover with the rigid-foam body results, which is secure against unintended damage.

At least one stiffening element can be inserted into the second hollow chamber before the second hollow chamber is closed by means of the second lid. This can be advantageous, for example, if the rigid-foam reaction mixture is a viscous-rigid PU system. This stiffening element may be, for example, in the form of a frame, a grid or a network and may be made of plastic, metal, or the like.

At least one fastening element may be inserted into the second hollow chamber, which extends with its fastening element into the second lid when the second hollow chamber is tightly covered with the second lid.

This fastening element may be, for example, a threaded pin, a fastening screw, or the like. It is, of course, also feasible to provide the second lid with recesses on its front facing the soft-foam body, so that on the back surface of the rigid-foam body corresponding to the front of the second lid fastening elements extending from this back surface are formed, for example in the form of fastening clips, i.e. in the form of elastic snap-in catch elements.

It is also possible to insert into the second hollow chamber at least one fastening means which closely abuts on the front of the second lid facing the soft-foam body when the mold is closed by means of the second lid. These fastening elements may be, for example, in the form of sleeves having an inner threaded bore. By means of the last described fastening elements or fastening means it is possible to securely connect an upholstery element having a soft-foam body and a rigid-foam body with, for example, a covering, which may be a deep-drawn sheet metal element, a structural part of a seat manufactured by molding or any other method whatsoever, or the like.

Further details, characteristics and advantages ensue from the following description of a schematically illustrated mold for manufacturing an upholstery element, as well as from the following description of exemplary embodiments of upholstery elements manufactured in such a mold.

DETAILED DESCRIPTION OF THE PREFERRED EMBODIMENTS

Figure 1:
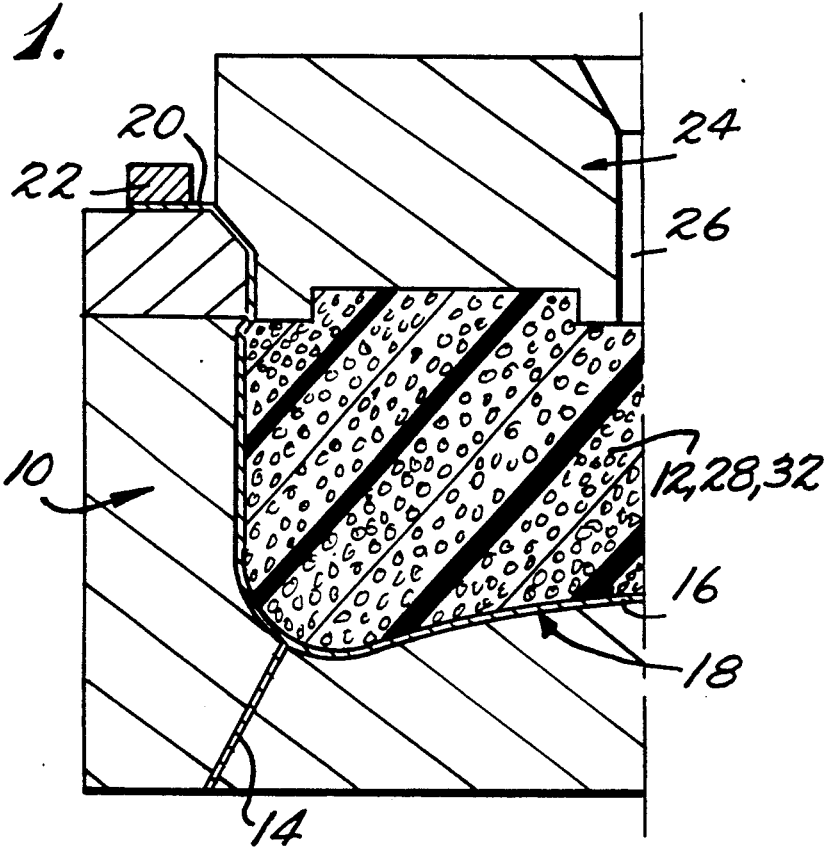
FIG. 1 is a sectional view through a mold closed by means of a first lid.
Figure 2:
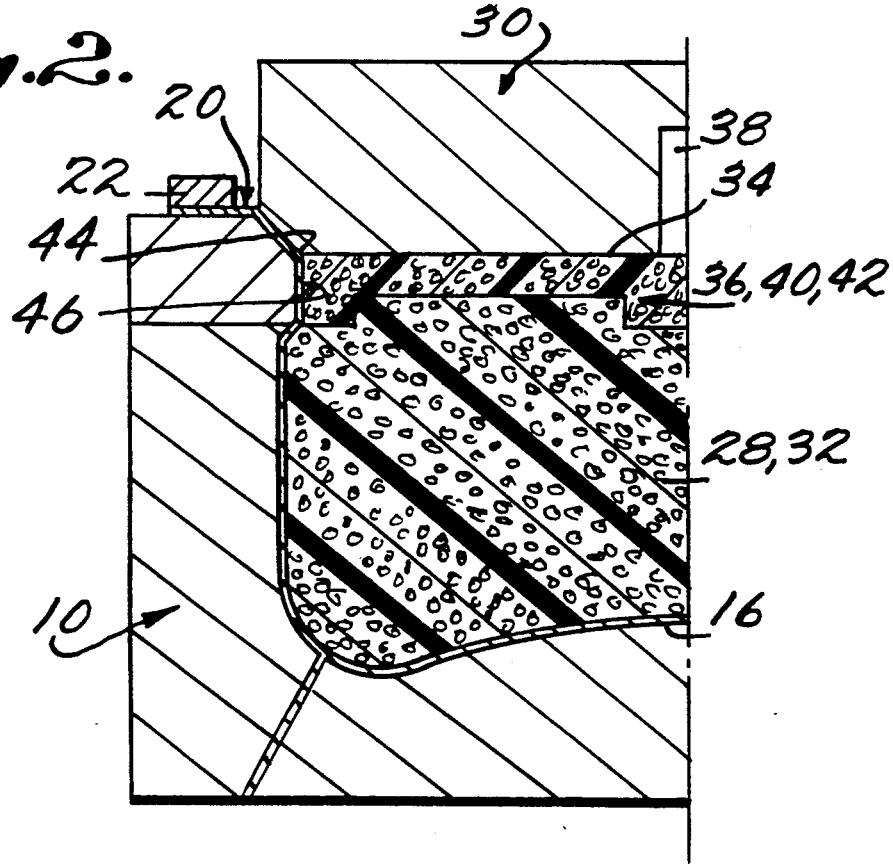
FIG. 2 is an illustration of the mold corresponding to FIG. 1, where it is closed by means of a second lid.

FIG. 1 shows a mold 10 with a hollow chamber 12 into which suction channels 14 lead, only one suction channel has been shown for the sake of simplicity. In a first operational step, a cover 16 is introduced into the hollow chamber 12 of the mold 10, which closely and without wrinkles adheres to the contour 18 of the mold 10 which defines the hollow chamber 12. The cover 16 can be held against the contour 18 of the mold 10 by means of the suction channels 14. The border area 20 of the cover 16 extending out of the mold 10 is clamped to the mold 10 by means of a stretch frame 22. Following clamping of the cover 16 by means of the stretch frame 22 or after the cover 16 abuts closely and without wrinkles on the contour 18 of the mold 10, the mold 10 is closed by means of a first lid 24, the border area 20 of the cover 16 being tightly clamped between the first lid 24 and the mold 10. A first hollow chamber of the mold 10 is closed off by the first lid 24 and is designated by reference numeral 12 in FIG. 1. The first lid 24 has an inlet channel 26, by means of which a soft-foam reaction mixture 28 is introduced into the first hollow chamber 12 of the mold 10. The soft-foam reaction mixture 28 foams up in the course of the reaction of the soft-foam reaction mixture 28, so that it fills the first hollow chamber 12. Subsequently that first lid 24 of the mold 10 is removed and a second lid 30 is disposed on the mold 10, such as shown in FIG. 2. The second lid 30 is shaped in such a way that a second hollow chamber 36 is formed between the soft-foam body 32, produced from the soft-foam reaction mixture 28 and remaining in the hollow chamber 12 of the mold 10 after removal of the first lid 24, and the front 34 of the second lid 30 facing the soft-foam body 32. In this operational position the cover 16 is also clamped to the mold 10 by means of the stretch frame 22. Additionally, the cover 16 is clamped with its border area 20 to the mold 10 by means of the second lid 30. In the operational position shown in FIG. 2, a rigid-foam reaction mixture 40 is introduced through the inlet channel 38 provided in the second lid 30, which foams up during reaction and fills the second hollow chamber 36. A rigid-foam body 42, mechanically securely connected to the soft-foam body 32, results at the end of the reaction of the rigid-foam reaction mixture 40. Naturally the amount of the rigid-foam reaction mixture must be chosen in such a way that excessive overpressure, by which the soft-foam body 32 might be damaged, is avoided in the course of the reaction of the rigid-foam reaction mixture 40.

Figure 3:
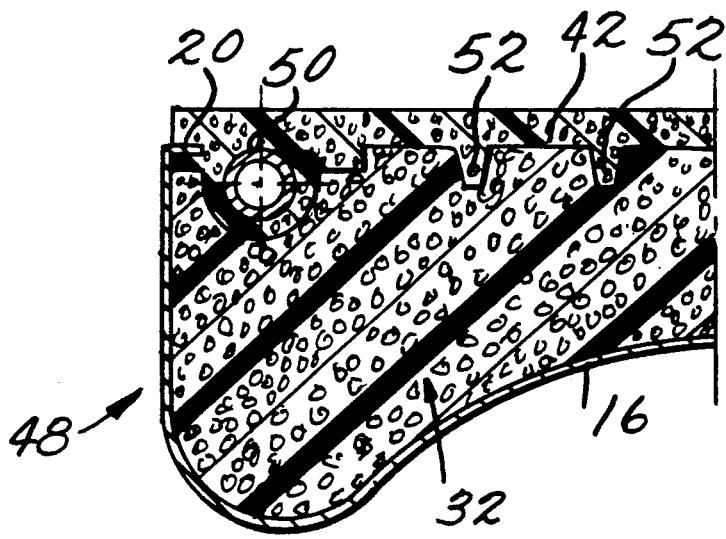
FIG. 3 is a sectional view through one half of an upholstery element which has been provided with a stiffening element.

At the end of the reaction of the rigid-foam mixture 40, the second lid 30 is removed from the mold 10. Simultaneously or subsequently thereto the stretch frame 22 is removed from the mold 10 and the upholstery element consisting of the soft-foam body 32 and the rigid-foam body 42 is removed from the mold 10. Subsequently the border area 20 of the cover 16 extending beyond the upholstery element is cut off the upholstery element along the edge 44 (see FIG. 2). An upholstery element is created in this manner, in which the cover 16 tightly adheres over a large surface to the soft-foam body 32 and to the peripheral edge 46 of the rigid-foam body 42. In FIG. 3 an upholstery element 48 is shown cut in half, which has a soft-foam body 32 and a rigid-foam body 42 connected with the soft-foam body 42. The cover 16 completely covers the soft-foam body 32 and the border area 20 of the cover 16 blends into the rigid-foam body 42. This results in a secure connection of the cover 16 with the rigid-foam body 42. A stiffening element 50 is disposed in the rigid-foam body 42 which may be, for example, a tubular frame. Additionally, the rigid-foam body 42 has stiffening ribs 52 which can be formed by a suitable design of the first lid 24 (see FIG. 1). It is possible to use, for example, a polyurethane RIM system as rigid-foam reaction mixture for the rigid-foam body 42.

Figure 4:
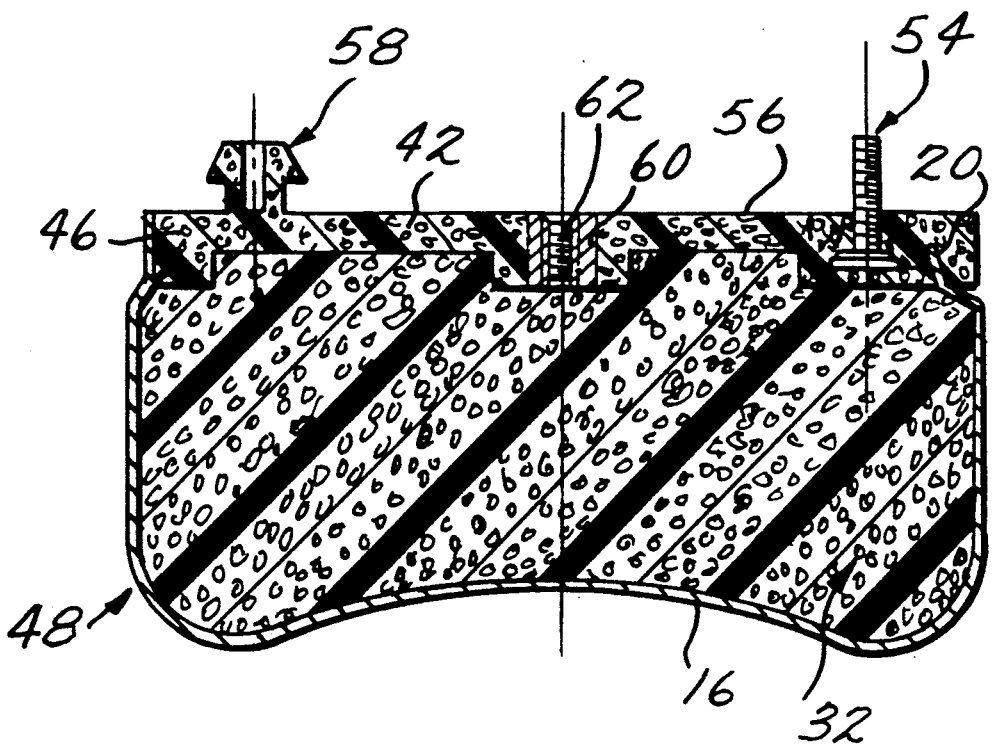
FIG. 4 is a sectional view through an upholstery element having various fastening elements or a fastening means.

FIG. 4 is a section through an upholstery element 48 made of a soft-foam body 32 and a rigid-foam body 42, the soft-foam body 32 being completely covered by a cover 16. The cover 16 is fastened on the left side of the upholstery element 48 flat on the border area 46 of the rigid-foam body 42. In contrast to this a border section 20 of the cover 16 is shown on the right side of the upholstery element 48, which is located in the interior of the rigid-foam body 42. This results in a more secure fastening of the cover 16 on the upholstery element 48 than in the embodiment shown on the left side of the upholstery element 48 in FIG. 4. A fastening element 54, for example in the form of a fastening screw, a threaded pin, or the like, extends out of the rigid-foam body 42. Construction of the upholstery element 48 including such a fastening element 54 extending out of the back 56 of the upholstery element 48 is possible when the front 34 of the second lid 30 (see FIG. 2) is provided with corresponding recesses for receiving the respective protruding section of the fastening element 54. A fastening element 58 is shown on the left side of the upholstery element 48 in FIG. 4, which protrudes as one piece from the back 56 of the rigid-foam body 42 and is in the form of an elastic snap-in catch element. In contrast to the fastening element 58 which is formed on the rigid-foam body 42 as one piece, the fastening element 54 is a fastening element foamed as one piece with the rigid-foam body 42 and protruding from the rigid-foam body 42. A fastening means 60 in the shape of an inner threaded bore 62 is provided in the center area of the upholstery element 48. The inner threaded bore 62 of the fastening means 60 extends into the back 56 of the upholstery element 48 so that it becomes possible to screw a threaded pin into the inner threaded bore 62 in order to connect the upholstery element 48 with a structural element not shown in the drawing in a mechanically fixed manner; The fastening elements 54 and/or 58 serve the same purpose.

The rigid-foam body 42 also provides the advantage of a waterproof seal of the upholstery element 48 from its back 56. This is the case in particular when the fastening elements 54 and/or 58 are used.

Figure 5:
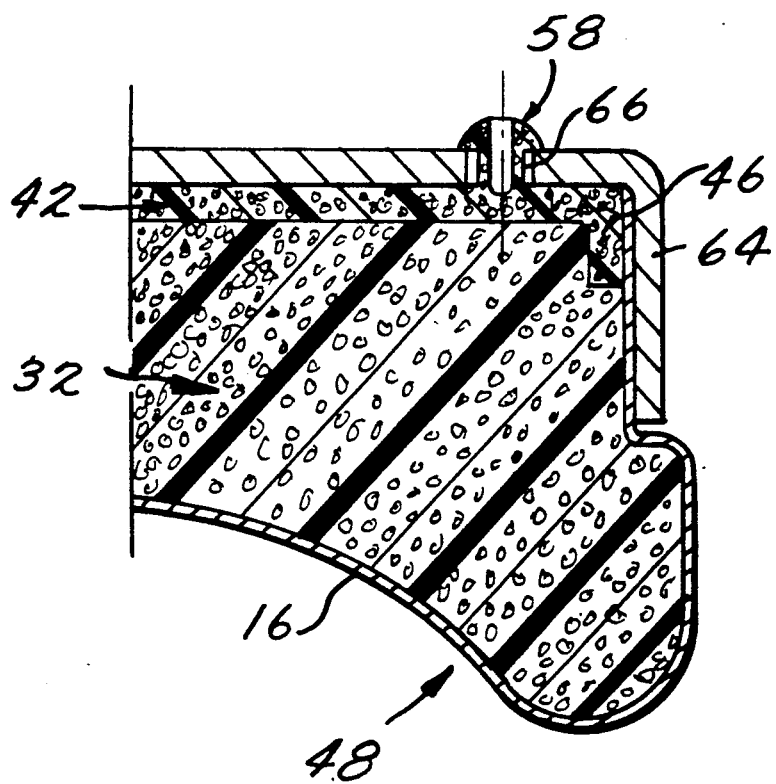
FIG. 5 is a sectional view of an upholstery element which is mechanically fixedly connected with a covering element.

FIG. 5 shows a section of an upholstery element 48 with a soft-foam body 32 and a rigid-foam body 42 connected with the soft-foam body 32 which is disposed on the back of the soft-foam body 32. The rigid-foam body 42 is formed as one piece with a fastening element 58, the same as is shown on the left side of FIG. 4 and referred to above. It is possible to connect a covering 64 easily and rapidly by means of the fastening element 58 in a mechanically fixed manner with the upholstery element 48. This covering may be made of a plastic material, of metal or of any desired other material. A covering 64 made of metal could be a deep-drawn sheet metal piece or a molded structural element. Openings 66 are provided in the covering 64, which are distributed to match the fastening elements 58. In this Fig., too, a cover has been designated by the reference numeral 16, covers the soft-foam body 32 and is fastened with its border area to the peripheral edge 46 of the rigid-foam body 42.

Figure 6:
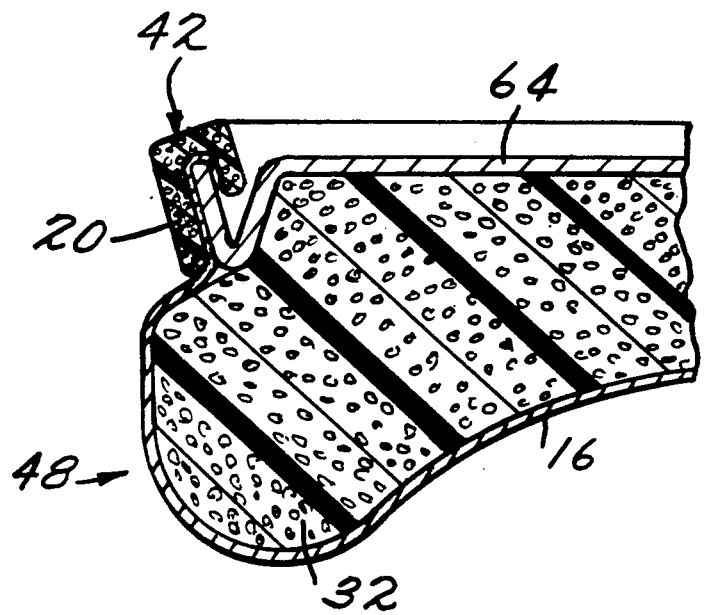
FIG. 6 is a sectional view of an upholstery element with a covering, the upholstery element shown in FIG. 6 being different from the upholstery element shown in FIG. 5 in particular in that the covering directly abuts with a large surface on the soft-foam body and not with a large surface on the rigid-foam body of the upholstery element.

FIG. 6 shows another embodiment of an upholstery element 48, where the soft-foam body 32 is covered directly with a covering 64 on its back facing away from the cover 16. Fastening of the covering 64 is accomplished by means of a rigid-foam body 42, which is clamp-like in the shape of a frame, in which the cover 16 is fixed with its border area 20. A rigid-foam body 42, as shown in FIG. 6, can be manufactured by a suitable construction of the first lid 24 and the second lid 30. The covering 64 is, for example, a deep-drawn or crimped sheet metal element, the cover 16 may be made of a textile material, of imitation leather, of leather, or the like. The rigid-foam body 42 preferably consists of a polyurethane RIM system.

Figure 7:
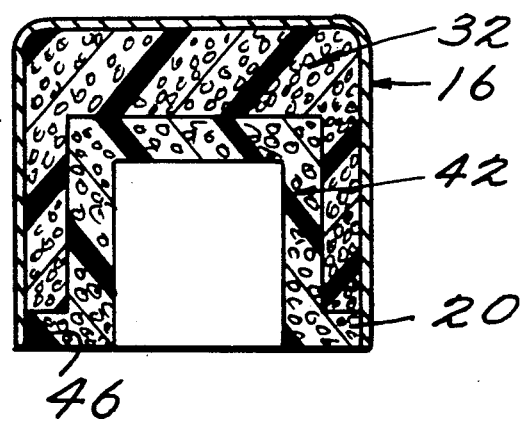
FIG. 7 is a sectional view through a first embodiment of an upholstery element in the form of an armrest.
Figure 8:
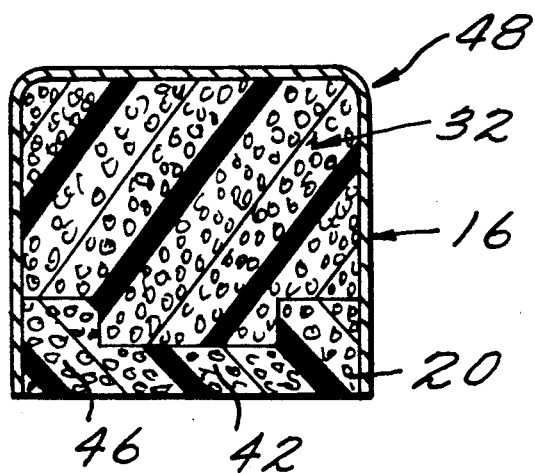
FIG. 8 is sectional view through a second embodiment of an upholstery element in the form of an armrest.
Figure 9:
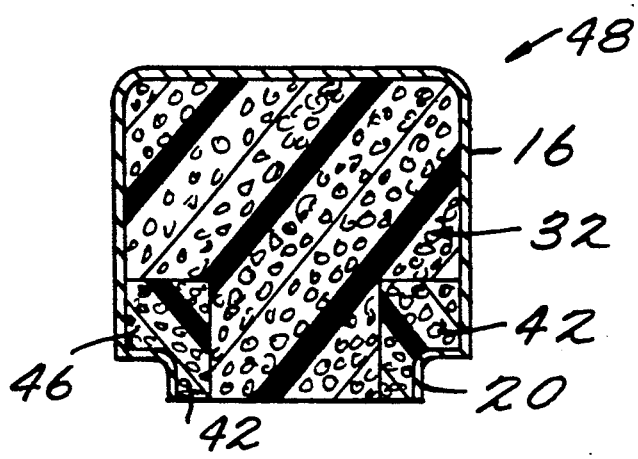
FIG. 9 is sectional view through a third embodiment of an upholstery element in the form of an armrest.

FIGS. 7 to 9 show various embodiments of an upholstery element 48 in the shape of an armrest, having a soft-foam body 32, a rigid-foam body 42 fixedly connected with the soft-foam body 32, and a cover 16 which surrounds the soft-foam body 32 on all sides and which is fastened with its border area 20 at the peripheral edge 46 of the rigid-foam body 42. The cover 16 may, of course, also be connected over a large surface with the soft-foam body 32.

What is claimed is:

1. A method of forming an upholstery element with the use of a mold closeable by a first lid to define a first closed hollow chamber and by a second lid to define a second hollow chamber, said method comprising the steps of introducing a cover to said mold in such a way as to adhere tightly to sides of said mold.

closing said mold by said first lid so that the first closed hollow chamber is defined in part by the cover, clamping a border area of the cover between the mold and the first lid at the time the mold is closed by the first lid, introducing a soft foam reaction mixture into the first closed hollow chamber and reacting the same to form a soft foam body (1) filling the first closed hollow chamber and (2) adhering to the cover defining part of the first closed hollow chamber, removing the first lid from said mold and closing said mold by said second lid so that the second hollow chamber is defined in part by the soft foam body, introducing a rigid-foam reaction mixture into the second hollow chamber and reacting the same to form a rigid-foam body (1) filling the second hollow chamber and (2) adhering to the soft foam body defining part of the second closed hollow chamber so that the rigid foam body serves as a support element for the soft foam body and adhered cover of the upholstery element thus made, and introducing the border area of the cover into the second hollow chamber after removal of the first lid and prior to closing of the mold by the second lid, after which the second hollow chamber is foamed with the rigid-foam reaction mixture so that the border area is embedded in the rigid-foam body.

2. A method in accordance with claim 1, wherein at least one stiffening element is inserted into the second hollow chamber before the second hollow chamber is closed by closing the mold by the second lid.

3. A method in accordance with claim 1, wherein at least one fastening element is inserted into the second hollow chamber which extends with said fastening element into the second lid when the second hollow chamber is tightly covered by closing the mold by the second lid.

4. A method in accordance with claim 1, wherein at least one fastening means is inserted into the second hollow chamber which closely abuts on a front of the second lid facing the soft-foam body when the mold is closed by the second lid.

* * * * *